United States Patent [19]

Jorgensen

[11] Patent Number: 4,710,538

[45] Date of Patent: Dec. 1, 1987

[54] PROCESS FOR THE PRODUCTION OF A STICKY POLYMER

[75] Inventor: Robert J. Jorgensen, Belle Mead, N.J.

[73] Assignee: Union Carbide Corporation, Danbury, Conn.

[21] Appl. No.: 837,215

[22] Filed: Mar. 10, 1986

[51] Int. Cl.⁴ .................................................. C08F 2/34
[52] U.S. Cl. ..................................... 525/53; 525/319; 525/344; 525/356; 526/65; 526/73; 526/88; 526/901; 422/134
[58] Field of Search ..................... 526/65, 88, 73, 901; 422/134; 525/53, 319, 344, 356

[56] References Cited

U.S. PATENT DOCUMENTS

| | | | |
|---|---|---|---|
| 2,502,953 | 4/1950 | Jahnig | 196/52 |
| 3,957,448 | 5/1976 | Shepard et al. | 23/288 |
| 3,970,611 | 7/1976 | Jezl et al. | 526/65 |
| 3,971,768 | 7/1976 | Peters et al. | 526/68 |
| 4,129,701 | 12/1978 | Jezl et al. | 526/65 |
| 4,188,470 | 2/1980 | Collina et al. | 526/901 X |
| 4,343,926 | 8/1982 | Caumartin et al. | 526/336 X |
| 4,372,758 | 2/1983 | Bobst et al. | 55/48 |
| 4,482,687 | 11/1984 | Noshay et al. | 526/125 |

OTHER PUBLICATIONS

Chemical Reaction Eng'ing, Levenspiel, Wiley and Sons, N.Y. (1962), pp. 99, 100, 261, 295–296.

*Primary Examiner*—Joseph L. Schofer
*Assistant Examiner*—F. Teskin
*Attorney, Agent, or Firm*—Saul R. Bresch

[57] ABSTRACT

A process for the gas phase production of a sticky, but fluidizable, polymer comprising (i) introducing at least one gaseous monomer, which is a precursor for the polymer, into a bed of particles located in a fluidized bed reactor at a velocity sufficient to cause the particles to separate and act as a fluid; (ii) introducing into the bed a catalyst adapted to cause the monomer to polymerize; (iii) contacting the catalyst with the monomer at a temperature below the sticking temperature of the polymer and at a temperature and pressure sufficient to polymerize the monomer in the presence of the catalyst whereby the polymer is produced; and (iv) passing the polymer from the fluidized bed reactor into at least one fluid bed reactor wherein a fluidizing gas is passed through a bed of particles at a velocity sufficient to cause the particles to separate and act as a fluid; the polymer is passed through the fluid bed reactor in an essentially plug flow mode; and the polymer is maintained in an agitated state.

7 Claims, No Drawings

PROCESS FOR THE PRODUCTION OF A STICKY POLYMER

TECHNICAL FIELD

This invention relates to a process for the production of a sticky polymer.

BACKGROUND ART

The term "sticky polymer" is defined as a polymer, which, although particulate at temperatures below the sticking temperature, agglomerates at temperatures above the sticking temperature. The term "sticking temperature", which, in the context of this specification, concerns the sticking temperature of particles of polymer in a fluidized bed, is defined as the temperature at which fluidization ceases due to the agglomeration of particles in the bed. The agglomeration may be spontaneous or occur on short periods of settling.

A polymer may be inherently sticky due to its chemical or mechanical properties or pass through a sticky phase during the production cycle. Sticky polymers are also referred to as non-free flowing polymers because of their tendency to compact into aggregates of much large size than the original particles and not flow out of the relatively small openings in the bottom of product discharge tanks or purge bins. Polymers of this type show acceptable fluidity in a gas phase fluidized bed reactor; however, once motion ceases, the additional mechanical force provided by the fluidizing gas passing through the distributor plate is insufficient to break up the aggregates which form and the bed will not refluidize. These polymers are classified as those, which have a minimum bin opening for free flow at zero storage time of up to two feet and a minimum bin opening for free flow at storage times of greater than five minutes of 4 to 8 feet or more.

Sticky polymers can also be defined by their flow. This is called the Flow Factor, which references the flow of all materials to that of dry sand. On a scale of 1 to 10, the Flow Factor of dry sand is 10. The Flow Factor of free flowing polymers is about 4 to 10 while the Flow Factor of non-free flowing or sticky polymers is about 1 to 3.

Because of the tendency to agglomerate, sticky polymers are difficult to produce in typical gas phase processes, which are usually carried out in fluidized beds. Both economic and safety/environmental considerations indicate, however, that fluidized bed type polymerization is preferred for the manufacture of polymers that can exist in a granular, fluidizable form.

Although polymers that are sticky can be produced in non-gas phase processes, there are certain difficulties associated with the production of such products in, for example, slurry or bulk monomer polymerization processes. In such processes, the diluent or solvent is present in the resins exiting the reaction system at a high concentration leading to severe resin purging problems, particularly if the material in question is a low molecular weight resin or a very low crystallinity resin. Environmental considerations are such that the dissolved monomers and diluent must be removed from the polymer prior to its exposure to air. Safety also dictates the removal of residual hydrocarbons so that closed containers containing the polymers will not exceed safe volatiles levels in the gas head space over the resin. The safety and environmental concerns are accompanied by a definite economic factor in determining a preference for a gas phase fluid bed reaction system. The low number of moving parts and the relative lack of complexity in a basic fluidized bed process enhances the operability of the process and typically results in lower costs of production. Low costs of production are due, in part, to low volumes of recycled process streams and a high unit throughput.

Three major process types are currently used for the production of some of these sticky resins. (1) The bulk monomer slurry process is quite efficient for contacting monomers with catalyst and obtaining high productivity. Some of the disadvantages associated with this process are the relatively high pressures used; and the very high concentration of dissolved monomer in the resin exiting the reactor. This type of process is characterized by a relatively small volume main reactor coupled to extensive monomer recovery/polymer flash and recovery facilities. (2) The diluent slurry process operates in a manner similar to the bulk monomer slurry process; however, the reactor tends to be larger and of lower pressure capability due to a lower monomer concentration requiring a larger reactor volume for the same rate of polymerization. The same disadvantages of the bulk slurry process are shared by the diluent slurry process. If the polymer is permitted to dissolve in the diluent, the solution viscosity increases drastically leading to reactor fouling. Relatively large diluent/monomer recovery systems must be maintained to economically recover same from purge bins and product recovery systems. (3) The solution process allows operation at higher reaction temperatures with improved heat removal. It also allows high polymerization rates for given reactor size due to the usually positive effect of reaction temperature on the activity of the polymerization catalyst. A major disadvantage of the solution process is the typically cumbersome recovery methods required for polymer and solvent. These methods require a significant amount of equipment and produce the final polymer in pellet form, which can be difficult to purge of residual monomer and solvent to environmentally safe and acceptable levels. One additional safety factor involved in the use of a solution process is the presence of a large volume of hot solvent, frequently well above the flash point, which contains a significant amount of dissolved polymer. Spills of this type of material present significant hazards with regard to fire and personnel exposure. A further disadvantage of the solution process is that the rate and, to some extent, the operability of the system is dependent on the molecular weight and solubility of the particular product being produced. Products of higher density than desired (or designed for) will precipitate in cool spots in the lines and foul the reaction system. Products of higher molecular weight will increase solution viscosity to the point that the design capability of the circulation system will be exceeded and operations will become impractical. A major product deficiency of the solution processes is that they are inherently incapable of production of desirable high molecular weight or ultrahigh molecular weight grades of resin.

All of the above processes, although usable for the production of many different types of polymers, have deficiencies that are not present in the fluidized bed reaction system. The absence of large volumes of solvent or liquid monomer increases the safety of the system. The granular nature of the resultant polymer increases the flexibility of the system in that both granular resin and compounded resin can be delivered to the customer. The granular, porous nature of the polymer also facilitates purging of unwanted monomer to environmentally safe levels. A wide range of molecular weights can be produced in a fluidized bed, i.e., from ultrahigh molecular weights having a melt index of less than 0.001 to relatively low molecular weights having a melt index of up to 100. Melt index is measured under ASTM D-1238, Condition E, at 190° C. and reported as grams per 10 minutes. The high heat removal capacity of a fluidized bed (due to the circulation of the fluidizing gas) and the ability to control reaction concentrations without the limitations imposed by the solubility of components such as hydrogen in the diluent are also desirable features of the fluidized bed process.

It is clear, then, that the production of polymer by means of a fluidized bed reaction system is advantageous. A typical system of this type is described in U.S. Pat. No. 4,482,687, which is incorporated by reference herein. Unfortunately, this system requires that the granular product be free-flowing.

DISCLOSURE OF INVENTION

An object of this invention, therefore, is to provide a process whereby sticky polymers can be produced in a fluidized bed with essentially no agglomeration occurring on discharge, purge, or post-polymerization modification.

Other objects and advantages will become apparent hereinafter.

According to the present invention, a process has been discovered for the gas phase production of a sticky, but fluidizable, polymer comprising (i) introducing at least one gaseous monomer, which is a precursor for the polymer, into a bed of particles located in a fluidized bed reactor at a velocity sufficient to cause the particles to separate and act as a fluid; (ii) introducing into the bed a catalyst adapted to cause the monomer to polymerize; (iii) contacting the catalyst with the monomer at a temperature below the sticking temperature of the polymer and at a temperature and pressure sufficient to polymerize the monomer in the presence of the catalyst whereby the polymer is produced; and (iv) passing the polymer from the first reactor into at least one fluid bed reactor wherein a fluidizing gas is passed through a bed of particles at a velocity sufficient to cause the particles to remain separate and act as a fluid; the polymer is passed through the reactor in an essentially plug flow mode; and the polymer is maintained in an agitated state.

In a preferred process wherein the pressure in the fluidized bed reactor is at least 150 psig, the polymer produced in step (iii) is introduced, prior to step (iv), into a zone wherein the pressure is reduced to a pressure less than about 30 psig and the polymer is agitated. The polymer is then passed into the reactor referred to in step (iv).

In still another preferred process: in step (iv), the polymer is introduced into at least two reactors essentially the same as the reactor defined in step (iv), said reactors being connected in series, with the proviso that the fluidizing gas passed through the bed of the last reactor in the series is an inert gas.

DETAILED DESCRIPTION

The fluidized bed reactor (first reactor) can be the one described in U.S. Pat. No. 4,482,687 or another conventional reactor for the gas phase production of, for example, polyethylene or ethylene copolymers. The bed is usually made up of the same granular resin that is to be produced in the reactor. Thus, during the course of the polymerization, the bed comprises formed polymer particles, growing polymer particles, and catalyst particles fluidized by polymerizable and modifying gaseous components introduced at a flow rate or velocity sufficient to cause the particles to separate and act as a fluid. The fluidizing gas is made up of the initial feed, make-up feed, and cycle (recycle) gas, i.e., monomer and, if desired, modifiers and/or an inert carrier gas. The fluidizing gas can also be a halogen or sulfur dioxide or other reactive gas. A typical cycle gas is comprised of ethylene, nitrogen, hydrogen, and propylene, butene, or hexane monomers, either alone or in combination. Examples of sticky polymers, which can be produced by subject process are ethylene/propylene rubbers and ethylene/propylene diene termonomer rubbers, polybutadiene rubbers, high ethylene content propylene/ethylene block copolymers, poly (1-butene) (when produced under certain reaction conditions), very low density (low modulus) polyethylenes, i.e., ethylene butene rubbers or hexene containing terpolymers, and ethylene/propylene/ethylidene norbornene terpolymers of low density. The process can also be used for chlorination or chlorosulfonation, and propylene chlorination or chlorosulfonation, and propylene systems. In the chlorination and chlorosulfonation processes, the polymer passes through a sticky phase rather than being inherently sticky.

Subject process can be carried out in a batch or continuous mode, the latter being preferred.

Characteristics of two types of resins which can be produced in subject process are as follows:

One type of resin is an ethylene/propylene rubber containing 25 to 50 percent, by weight, propylene. This material is sticky to the touch at reactor temperatures of 20° C. to 40° C. and has a severe tendency to agglomerate when allowed to settle for periods of more than two to five minutes. Another sticky resin is an ethylene/butene copolymer produced at reactor temperatures of 50° C. to 80° C. at density levels of 880 to 905 kilograms per cubic meter and melt index levels of 1 to 20 and chlorinated or chlorosulfonated after being produced in the fluidized bed reactor.

The essential parts of the first reactor are the vessel, the bed, the gas distribution plate, inlet and outlet piping, a compressor, a cycle gas cooler, and a product discharge system. In the vessel, above the bed, there is a velocity reduction zone, and in the bed, a reaction zone. Both are above the gas distribution plate.

Variations in the reactor can be introduced if desired. One involves the relocation of the cycle gas compressor from upstream to downstream of the cooler and another involves the addition of a vent line from the top of the product discharge vessel (stirred product tank) back to the top of the first reactor to improve the fill level of the product discharge vessel.

The temperature of the first reactor is maintained below the sticking temperature of the product, the temperature and pressure being sufficient to polymerize the monomer(s) in the presence of the catalyst. Typically, for a sticky polymer such as an ethylene/propylene rubber, a catalyst as described in U.S. Pat. No. 4,482,678, incorporated by reference herein; the temperature is in the range of about 10° C. to about 40° C.; the pressure is in the range of about 150 psig to about 300 psig; and the velocity of the fluidizing gas is in the range of about 0.3 to about 1.0 meter per second.

The use of a quench liquid or any liquid hydrocarbon is not preferred due to the already sticky nature of the polymer being produced and the high solubility of hydrocarbon liquids in the resin.

The polymer product and residual gases pass out of the first reactor under pressure into a reduced pressure zone where the polymer is maintained in an agitated state. Preferably, the pressure in the first reactor is at least about 150 psig and this pressure is reduced to a pressure of less than about 30 psig. If the zone is not used, the reduction in pressure takes place in the second reactor. The zone into which the product is discharged can be, for example, a tank with a modified anchor type agitator. The agitator keeps the resin in constant motion during its stay in the zone. Various purges can be undertaken in this zone, e.g., a purge with cycle gas, which is then compressed and sent back to the reactor, or a purge with nitrogen, which is flared. The purge removes dissolved hydrocarbons from the polymer. After the zone is depressurized, a rotary valve can be provided to drop the resin onto a conveyor for transfer to the second reactor. In a preferred equipment layout, the tank is directly above the second reactor to facilitate transfer.

The polymer is then introduced into a fluid bed reactor (second reactor) similar in many respects to the first reactor except that it is adapted to maintain the polymer in an agitated state and provide for passage of the polymer in an essentially plug flow mode. A preferred reactor is a horizontal stirred bed equipped with internal weirs. One means for stirring is a ribbon blender. Other stirring means are exemplified by paddle-type stirrers and turbine agitators. The stirring devices are preferably mounted on a shaft, which extends the length of the vessel.

As noted, the polymer passes through this bed in an essentially plug flow mode, and the flow is preferably horizontal. Plug flow is defined as follows: a condition in which (i) the age or residence time of a discrete particle or element of fluid in the reactor is dependent on its position within the reactor, i.e., as particles enter the reactor, they move through the reactor at a rate equal to the input rate of new particles or elements, and (ii) the age or residence time of the material surrounding any discrete particle or element is the same as the particle or element. In order to effect the essentially plug flow mode, the reactor vessel is equipped with internal weirs, which control the level of the polymer in the interior of the vessel. The weirs are barriers to solid flow placed in the bottom of the vessel. They are vertical members, which are usually quite close to the radius of the vessel in height, although taller weirs can be utilized. The weirs are arranged so that the tallest weir is located at the beginning of the reactor, i.e., the point of entrance of the polymer from the preceding reactor, and decrease in height along the length of the reactor. This prevents backflow of polymer. The weirs are also equally spread to form chambers of about equal dimensions insofar as the length and width are concerned. The height of the weirs controls the volume of the polymer within the bed. The polymer passes over the top of the weirs from chamber to chamber resulting in the flow of solids through the vessel in an essentially plug flow mode. This condition is analogous to the use of multiple back-mixed reactors connected in series. The weirs are, preferably, set to maintain the second reactor approximately one half full of solids. Plug flow assures that the age distribution of resin exiting the reactor is essentially constant. Constant age distribution is particularly important when the removal of residual hydrocarbon gases to environmentally safe levels is desired.

The gas flow through the stirred vessel is kept at a sufficient velocity to maintain the polymer in a fluid state. The minimum velocity required to maintain the polymer in a fluid state is called the minimum fluidization velocity. Thus, the gas flow rate may be lower (in terms of velocity) than that experienced in the first reactor. Preferred gas flow rates or velocities are from minimum fluidization velocity to about 2 to 3 times minimum fluidization velocity. Higher gas velocities can be used, but are not preferred. Use of extremely high velocities can be disadvantageous due to carryover if particles go into the gas collection system. A cycle gas purge for continued polymerization or a nitrogen purge for hydrocarbon degassing are usually directed through the base of each of the compartments formed in the second reactor by the weirs. The off-gas is collected and either sent to flare for combustion or collected by recompression and redirected to the first reactor to improve monomer efficiency. Typical residence times in the second reactor will be in the range of about 1 to 4 hours depending on the polymerization rate in the first reactor, the size of the second reactor, and the bulk density of the resin produced in the first reactor. The second reactor is preferably provided with cycle gas purge capability and a direct recycle compressor to send the off-gas from the reactor back to the first reactor.

The second reactor can be used to complete the removal of residual monomers through polymerization, if desired. Higher boiling monomers such as ethylidene norbornene (ENB), which is used in the production of EPDM, are conveniently removed in this fashion. The very high boiling point of this termonomer prevents the use of conventional counter-current purge system since the mass transfer rate of the monomer from the resin is so low that purge bin size becomes economically unfeasible well before acceptable purging has occurred. An example of a purge bin is the purge vessel described in U.S. Pat. No. 4,372,758, incorporated by reference herein. A simpler and more economical method for the removal of the last traces of residual high-boiling monomer is to polymerize it. The use of a low pressure stirred bed reactor allows for longer residence time at low cost to complete the polymerization. The addition of cycle gas provides sufficient additional monomer (in the case of EPDM ethylene and propylene) to complete the copolymerization of the higher boiling monomer. The plug flow nature of the vessel assists in monomer consumption since the resin exiting the reactor will have the same age distribution. The second reactor can also be used, for example, for propylene/ethylene block copolymer production or for chlorosulfonation or similar processes.

The product can then be sent to another fluid bed reactor (third reactor), which is the same or similar to the second reactor. Again, the resin is passed through in the plug flow mode and is maintained in a fluid state. In this case, the cycle gas purge is replaced with an inert gas purge, e.g., a nitrogen purge. This reactor can be used to complete product purging. If necessary, additional fluid bed stirred reactors can be used to complete purging, i.e., the last step can be repeated one or more times. Further, the third reactor and additional reactors of the same type can be used for additional polymerization, or for chlorination or chlorosulfonation. Thus, several reactors in series can carry out polymerization or polymer modification followed by one or more reactors, which carry out the inert gas purge. In any case, the plug flow nature of the horizontal stirred bed assures that all of the resin exiting the final purge will have the same age distribution and will be uniformly purged.

Again, a rotary valve can be used in the second reactor to allow material to exit into the third reactor. A preferred equipment layout is to have the third reactor located below the outlet of the second reactor to facilitate transfer.

Resin leaving the third reactor is discharged to a baling or bagging station or to a melt finisher.

Three typical systems are as follows:

1. The sticky polymer exists the first reactor and enters an agitation zone referred to as a stirred product tank. Cycle gas leaving the first reactor is cooled and compressed. Part of the cycle gas is returned to the first reactor and the other part passes into the stirred product tank. Nitrogen is also introduced into the stirred product tank. Part of the residual gases in the stirred product tank is flared and the other part is cycled to the first reactor. The polymer is then conveyed to a stirred fluid bed reactor. Cycle gas or ethylene, propylene, butene, and/or hydrogen are introduced into the second reactor where residual high boiling point monomer is reacted out. The cycle gas is then introduced into a compressor and returned to the first reactor. The polymer is introduced into another fluid bed reactor (third reactor), which is also stirred, and a final nitrogen purge is conducted. The off-gas is sent to flare or a scrubber. The polymer product is then discharged into a bagger, a baler, or a reactor where it undergoes melt finishing. The second reactor can be used for chlorination, chlorosulfonation, or block copolymerizing. It can also be used to polymerized any low volatility co-monomer with high solubility for improved monomer efficiency and lessened hydrocarbon emissions. The polymer is kept under inert gas until it is sent to the bagger or baler.

2. System 2 is concerned with the production of propylene/ethylene block copolymers. Propylene and ethylene are introduced into the first reactor. The scheme referred to in system 1 is repeated except that the product tank need not be stirred due to very short settling time in the product removal tank. The polymer is then rapidly conveyed to the second reactor where the stirring or agitation is accomplished with a ribbon blender and ethylene is introduced to complete block polymerization and produce a propylene/ethylene random copolymer with two different $C_3/C_2$ block compositions. The polymer is then sent to a third reactor for a nitrogen purge. Hydrogen or another molecular weight control agent can be added, if desired. The advantage is that the random $C_3/C_2$ copolymer produced in the first reactor can be of higher ethylene content than normally produced in a simple fluidized bed reactor.

3. The third system repeats the schemes in systems 1 or 2. The object is the production of polymers for sequential post reaction modification by chlorination or chlorosulfonation. If the polymer from the first reactor is sticky, the stirred product tank of system 1 is used. On the other hand, if the polymer from the first reactor is not sticky, the purge bin is used. Chlorination or chlorosulfonation are carried out in the second reactor and a final nitrogen purge is carried out in a third reactor. In both reactors, the off-gas is sent to a scrubber. The third reactor may or may not be a stirred bed depending on the flow properties of the final product.

The invention is illustrated by the following examples. Percentages are by weight unless otherwise noted.

EXAMPLE 1

A catalyst is prepared from a mixture of $MgCl_2/TiCl_3/3$ $AlCl_3$/tetrahydrofuran supported on silica that has been dehydrated at 600° C. under a nitrogen atmosphere. The support is treated with triethyl aluminum to passivate the surface through reaction with the remaining surface silanol groups, and with diethyl aluminum chloride and tri-n-hexyl aluminum to moderate the kinetic reaction behavior of the catalyst and promote good resin paticle shape, i.e., substantial absence of particles which are "blown open" and a minimum of hollow particles.

The catalyst is made in a two-step process. The magnesium chloride/titanium chloride/tetrahydrofuran salt is impregnated into the silica support from the tetrahydrofuran solvent. The composition of the catalyst precursor is as follows:

| component | percent by weight |
|---|---|
| $TiCl_3$ | 5.97 |
| $MgCl_2$ | 8.58 |
| tetrahydrofuran | 15.00 |
| support (silicon treated with $Al(C_2H_5)_3)$ | 70.45 |
| | 100.00 |

Analysis of the catalyst precursor:

| component | percent by weight |
|---|---|
| Ti | 1.437 |
| Mg | 2.188 |
| Al | 1.182 |
| Cl | 10.650 |
| tetrahydrofuran | 15.000 |
| silica | 69.540 |
| | 100.000 |

The precursor is contacted with diethyl aluminum chloride and tri-n-hexyl aluminum in an isopentane solvent; the residue is dried, and the catalyst is ready for use in the first reactor. The diethyl aluminum chloride and the tri-n-hexyl aluminum are added in amounts based on the tetrahydrofuran content. The diethyl aluminum chloride is added first at a mole ratio of 0.4/1 based on tetrahydrofuran. The tri-n-hexyl aluminum is then added at a mole ration of 0.1:1 based on the tetrahydrofuran. The finished catalyst is dried to a free flowing powder having the following composition:

| component | percent by weight |
|---|---|
| Ti | 1.24 |
| Mg | 1.888 |
| Al (total) | 3.43 |
| Cl (from Ti and Mg) | 9.19 |
| tetrahydrofuran | 12.94 |
| diethyl aluminum chloride | 8.62 |
| tri-n-hexyl aluminum | 5.07 |

Polymerization is initiated in the first reactor by feeding the above catalyst and a cocatalyst, triethylaluminum, into a fluidized bed of polyethylene granules. Reaction temperature is maintained at as high a level as practical to maximize polymerization rates, but below the sticking temperature. This is different from the sintering temperature, whichi s defined as the temperature at which a quiescent bed will agglomerate. The sintering temperature is lower than the sticking temperature.

The preparation of an ethylene/propylene/ethylidene norbornene terpolymer is described. The conditions and product properties in the first reactor are set forth in Table I below. All feeds enter the reactor as a gas except for the catalyst; the triethylaluminum cocatalyst, whichi s sprayed into either the bed or the recycle line as a mist; and the ethylidene norbornene, which is liquid at reaction conditions. The ethylidene norbornene may either be added to the bed directly or to the recycle line as a mist. The amount of ethylidene norbornene present in the reactor of steady-state is assumed to be equal to the ratio of the ethylidene norbornene feed rate to the production rate. Catalyst is fed at a rate sufficient to maintain the desired space time yield.

TABLE I

| (i) | first reactor conditions | |
|---|---|---|
| | temperature | 35° C. |
| | pressure | 300 Psig |
| | $C_2H_4$ concentration | 30 Psia |
| | $C_3/C_2$ mol ratio | 1.50 |
| | $H_2/C_2$ mol ratio | 0.15 |
| | ethylidene norbornene weight percent in bed (feed/rate) | 4.5 |
| | space time yield (pound/hour/cubic foot) | 3.0 |
| | cycle gas velocity (feet/second) | 2.60 |
| | cocatalyst concentration | 500 ppm (by weight) |
| | residence time | 5.0 hours |
| (ii) | product properties | |
| | melt index (decigram/minute) | 0.71 |
| | melt flow ratio | 45 |
| | $C_3$ incorporated | 11.5 mol percent |
| | ethylidene norbornene incorporated | 2.3 weight percent |
| | titanium residue | 8.4 ppm by weight |
| | minimum bin opening for flow 4 feet | |
| | Flow Factor (time = o) | 2.0 |

Notes:
(1) Melt index is determined by ASTM D-1238, Condition E, measured at 190° C. and reported as decigrams per minute.
(2) Melt flow ratio is the ratio of flow index to melt index.
(3) Flow index is determined by ASTM D-1238, Condition F, measured at 10 times the weight used in the melt index test above.

Polymer from the first reactor exists into the stirred product tank after initial depressurization. The depressurization cycle takes approximately 60 seconds during which the pressure of the polymer in the stirred product tank is decreased from 300 psig to approximately 30 psig, the pressure in the second reactor. The polymer then exits into a stirred second reactor through a rotary valve, i.e., a rotary feeder or similar device. Stirring is effected by a ribbon blender. Reaction conditions in the second reactor are regulated by feeding cycle gas through the bottom of each compartment of the second reactor. These compartments are formed by weirs, which create an essentially plug flow mode. No additional catalyst or cocatalyst are fed into the second reactor. The triethylaluminum concentration remains essentially constant, however, since the triethylaluminum is not fully consumed during the polymerization. This ensures that the constant polymerization that occurs in the second reactor will produce polymers that are similar in structure to the polymers prepared in the first reactor. The additional polymerization scavenges the remaining ethylidene norbornene and converts it into a polymer. Conditions and product properties with respect to the second reactor are described in Table II below.

TABLE II

| (i) | second reactor conditions | |
|---|---|---|
| | temperature | 35° C. |
| | pressure | 30 psig |
| | $C_2H_4$ concentration | 4.3 psia |
| | $C_3/C_2$ mole ratio | 1.50 |
| | $H_2/C_2$ mole ratio | 0.15 |
| | ethylidene norbornene (available) (Note 1) | 2.2 percent by weight |
| | space time yield (pound/hour/cubic foot) | 0.6 to 0.7 |
| | cocatalyst concentration | 500 ppm by weight |
| | residence time | 3 hours |
| | number of compartments (number of weirs +1) | 5.0 |
| | stirrer speed | 20 rpm |

Note (1): Available ethylidene norbornene is defined as total feed to productivity rate analyzed as percent by weight incorporated. This is the ethylidene norbornene. which is not polymerized in the first reactor. The ethylidene norbornene is consumed during the passage of polymer through the second reactor.

| (ii) | product properties | |
|---|---|---|
| | melt index | 0.7 |
| | melt flow ratio | 45 |
| | $C_3$ incorporated | 11.5 mole percent |
| | ethylidene norbornene incorporated | 3.6 weight percent |
| | Ti residue | 7.0 ppm by weight |

Note: the inlet Ti residue decreases due to the small amount of polymerization that occurs in the second reactor. The ethylidene norbornene is consumed at a rate that is relatively independent of the polymerization rate based on ethylene and propylene. Therefore, the polymer produced in the second reactor is relatively higher in actual ethylidene norbornene content than that produced in the first reactor while the ethylene and propylene contents are similar to that produced in the first reactor. Due to the relatively small amount of polymer produced in the second reactor, the melt index does not change significantly.

The polymer then exists the second reactor to what may be referred to as a third reactor although, in this case, the main function of the third reactor is to purge the polymer with nitrogen. The polymer enters the third reactor from the second reactor via a rotary valve. Nitrogen is fed to the base of the compartments formed by the weirs that provide plug flow as in the second reactor. As in the second reactor, the third reactor is stirred using a ribbon blender. The polymer slowly works through the vessel and residual gases are desorbed. Since only essentially pure nitrogen is used, some additional polymerization of ethylidene norbornene occurs during this phase of purging. Ethylidene norbornene is also degassed, further reducing the residual ethylidene norbornene level. Conditions in the third reactor (or purge vessel) are set forth in Table III. External heating is provided to maintain the temperature of the polymer in the third reactor and facilitate purging. All of the nitrogen is collected and either sent to flare for combustion or recycled through the first reactor.

TABLE III

| third reactor conditions | |
|---|---|
| temperature | 35° C. |

TABLE III-continued

| third reactor conditions | |
|---|---|
| pressure | 15 psig |
| nitrogen flow (pounds per hour per pound of polymer) | 0.05 to 0.1 |
| residence time | 1 hour |

Polymer exits the third reactor through a rotary valve and is typically sent to a compounding line where melt mixing of additives occurs. The additives may either be added in the melt mixer or in the third reactor where dispersal of the additive is enhanced by the mixing action. The polymer leaves the third reactor with essentially no dissolved ethylene or propylene and only small amounts of dissolved ethylidene norbornene.

EXAMPLE 2

Example 1 is repeated except as follows:

The polymer to be prepared is ethylene/butene/hexene terpolymer of melt index and density such that the polymer is sticky at reaction conditions utilized for polymerization. The ethylene and butene enter the first reactor as a gas. Hexene is sprayed into the cycle gas line where it partially vaporizes. Another part vaporizes in the bed. The gas entering the bottom of the bed is typically dry; however, the presence of minor amounts of liquid condensate entering the bottom of the reactor is not detrimental to the smooth operation of the first reactor. The condensing mode is described in U.S. Pat. No. 4,543,399, incorporated by reference herein. Gas compositions are maintained such that the presence of liquid phases in the fluidized bed is essentially avoided. This is accomplished by manipulating the ethylene partial pressure such that the dew point of the gas in the first reactor is always below the temperature in the first reactor.

Conditions and product properties are set forth in Table IV.

TABLE IV

| | | |
|---|---|---|
| (i) | first reactor conditions | |
| | temperature | 35° C. |
| | pressure | 300 psig |
| | C$_2$H$_4$ concentration | 30 psia |
| | C$_4$/C$_2$ mole ratio | 1.00 |
| | C$_6$/C$_2$ mole ratio | 0.10 |
| | H$_2$/C$_2$ mole ratio | 0.10 |
| | space time yield (pound per hour per cubic feet) | 3.0 3.0 |
| | cycle gas velocity | 2.6 feet per second |
| | cocatalyst concentration | 500 ppm by weight |
| | residence time | 5.0 hours |
| (ii) | product properties | |
| | melt index | 2.3 decigrams per minute |
| | melt flow ratio | 45 |
| | C$_4$ incorporated | 9.0 mole percent |
| | C$_6$ incorporated | 2.5 mole percent |
| | Ti residue | 2 to 3 ppm by weight |
| | minimum bin opening | greater than 4 feet |
| | Flow Factor (time = 0) | 2.5 |

In the second reactor, the additional polymerization scavenges the remaining dissolved hexene and converts it to polymer. The hexene present in the first reactor (dissolved in the polymer) is a function primarily of the hexene concentration in the gas phase. Since the lighter gases, ethylene and butene, rapidly degas during depressurization, the polymer entering the second reactor will be preferentially enriched in hexene initially. This condition rapidly changes to equilibrium.

Conditions and product properties in the second reactor are set forth in Table V.

TABLE V

| second reactor conditions | |
|---|---|
| temperature | 35° C. |
| pressure | 30 psig |
| C$_2$H$_4$ concentration | 4.3 psia |
| C$_4$/C$_2$ mole ratio | 1.00 |
| C$_6$/C$_2$ mole ratio | 0.10 |
| H$_2$/C$_2$ mole ratio | 0.10 |
| space time yield (pound per hour per cubic foot) | 0.6 to 0.7 |
| cocatalyst concentration | 500 ppm by weight |
| residence time | 3 hours |
| number of compartments (number of weirs +1) | 5 |
| stirrer speed | 20 rpm |
| product properties | |
| melt index | 2.3 |
| melt flow ratio | 45 |
| C$_4$ incorporated | 9.0 mole percent |
| C$_6$ incorporated | 2.5 mole percent |
| Ti residue | 2 to 3 ppm by weight |

The inlet Ti residue decreases due to the small amount of polymerization that occurs in the second reactor. The small additional amount of hexene that is present initially rapidly equilibrates with the gas phase concentration of hexene (0.43 psig) thus lowering the amount of dissolved hexene in the polymer.

Conditions in the third reactor are as follows:

TABLE VI

| third reactor conditions | |
|---|---|
| temperature | 35° C. |
| pressure | 15 psig |
| C$_6$ concentration | 10 to 20 ppm by weight |
| C$_4$ concentration | 5 to 10 ppm by weight |
| nitrogen gas flow (pounds/hour/ pound polymer) | 0.05 to 0.1 |
| residence time | 1.0 hour |

I claim:

1. A process for the gas phase production of a sticky, but fluidizable, polymer comprising (i) introducing at least one gaseous monomer, which is a precursor for the polymer, into a bed of particles located in a fluidized bed reactor at a velocity sufficient to cause the particles to separate and act as a fluid; (ii) introducing into the bed a catalyst adapted to cause the monomer to polymerize; (iii) contacting the catalyst with the monomer at a temperature below the sticking temperature of the polymer and at a temperature and pressure sufficient to polymerize the monomer in the presence of the catalyst whereby the polymer is produced; and (iv) passing the polymer from the fluidized bed reactor into at least one fluid bed reactor wherein a fluidizing gas is passed through a bed of particles at a velocity sufficient to cause the particles to separate and act as a fluid; the polymer is passed through the fluid bed reactor in an essentially plug flow mode; and the polymer is maintained in an agitated state by mechanical means.

2. The process defined in claim 1 wherein step (iv) is carried out in a second reactor and a third reactor, both fluid bed reactors; all reactors are connected in series; the fluidizing gas in the second reactor is selected from the group consisting of at least one monomer, a halogen, and sulfur dioxide; and the fluidizing gas in the third reactor is an inert gas.

3. The process defined in claim 1 wherein the particles in the beds have essentially the same composition as the polymer being produced.

4. The process defined in claim 1 wherein the pressure in step (iii) is at least about 150 psig; the polymer produced in step (iii) is introduced, prior to step (iv), into a zone wherein the pressure is reduced to a pressure of less than about 30 psig and the polymer is agitated; and the polymer is then passed from the zone into the reactor of step (iv).

5. The process defined in claim 1 wherein steps (i) to (iii) are carried out in a fluidized bed reactor and step (iv) is carried out in at least one fluid bed reactor; all reactors are connected in series; and the fluidizing gas in the last fluid bed reactor in the series is an inert gas.

6. The process defined in claim 1 wherein the fluid bed reactor is a stirred bed reactor.

7. The process defined in claim 6 wherein the stirred bed reactor is a horizontal stirred bed reactor equipped with internal weirs.

* * * * *